US008087173B2

(12) United States Patent
Tang et al.

(10) Patent No.: US 8,087,173 B2
(45) Date of Patent: Jan. 3, 2012

(54) MODULAR TOOL SYSTEM

(76) Inventors: Yu Kwong Savio Tang, Hong Kong (HK); Yury Vinokurov, Hong Kong (HK)

( * ) Notice: Subject to any disclaimer, the term of this patent is extended or adjusted under 35 U.S.C. 154(b) by 501 days.

(21) Appl. No.: 12/343,573

(22) Filed: Dec. 24, 2008

(65) Prior Publication Data

US 2009/0188049 A1 Jul. 30, 2009

Related U.S. Application Data

(60) Provisional application No. 61/062,776, filed on Jan. 30, 2008.

(51) Int. Cl.
*B23B 3/06* (2006.01)

(52) U.S. Cl. ................. 30/157; 30/155; 30/151; 30/339

(58) Field of Classification Search .................... 30/160, 30/161, 151, 152, 153–157, 514, 517, 339; 7/118–120, 128, 168; 403/349–351
See application file for complete search history.

(56) References Cited

U.S. PATENT DOCUMENTS

| | | | | |
|---|---|---|---|---|
| 822,432 | A * | 6/1906 | Crawford | 30/155 |
| 870,413 | A * | 11/1907 | Brown | 30/143 |
| 1,561,404 | A * | 11/1925 | Brenden | 30/156 |
| 3,007,244 | A * | 11/1961 | De Vern Austin | 30/162 |
| 4,854,045 | A | 8/1989 | Schaub | |
| 5,022,156 | A * | 6/1991 | Kallens et al. | 30/125 |
| 5,450,774 | A * | 9/1995 | Chang | 81/440 |
| 5,964,035 | A * | 10/1999 | Poehlmann | 30/161 |
| 6,038,723 | A * | 3/2000 | Nabors et al. | 7/128 |
| 6,223,439 | B1 * | 5/2001 | Wonderley | 30/162 |
| 6,523,265 | B2 * | 2/2003 | Eickhorn | 30/161 |
| 6,802,126 | B2 * | 10/2004 | Huang | 30/162 |
| 7,100,285 | B1 * | 9/2006 | Huang | 30/162 |
| 7,140,280 | B2 * | 11/2006 | Hawkins et al. | 81/440 |
| 7,654,004 | B2 * | 2/2010 | Tsuda | 30/152 |
| 2004/0134075 | A1 * | 7/2004 | Chu | 30/161 |
| 2005/0223562 | A1 * | 10/2005 | Pardue et al. | 30/161 |
| 2006/0080841 | A1 * | 4/2006 | Hatcher et al. | 30/155 |
| 2007/0006466 | A1 * | 1/2007 | Ping | 30/152 |
| 2007/0193036 | A1 * | 8/2007 | Carlson | 30/158 |
| 2008/0066318 | A1 * | 3/2008 | Ye | 30/155 |
| 2008/0172884 | A1 * | 7/2008 | Cheng | 30/155 |
| 2009/0293284 | A1 * | 12/2009 | Avery et al. | 30/152 |
| 2011/0118743 | A1 * | 5/2011 | Cannell et al. | 606/80 |

* cited by examiner

*Primary Examiner* — Sean Michalski
(74) *Attorney, Agent, or Firm* — Yimei C. Hammond; Kremblas & Foster

(57) ABSTRACT

A modular tool system includes a plate for carrying a tool, a top plate and a base plate. A pair of locking members is disposed at two opposite ends of the tool-carrying plate. Each lock member is rotatably mounted in the tool-carrying plate, and has an axis of rotation perpendicular the tool-carrying plate. Each locking member has a keyway for receiving and locking a corresponding key of the top plate, and a key for inserting and locking in a corresponding keyway of the base plate. Turning of the keys of the top plate relative to the keyways of the tool-carrying plate locks the top plate and the tool-carrying plate together, and further turning of the keys of the top plate turns the keys of the tool-carrying plate relative to the keyways of the base plate and locks the tool-carrying plate and the base plate together.

20 Claims, 2 Drawing Sheets

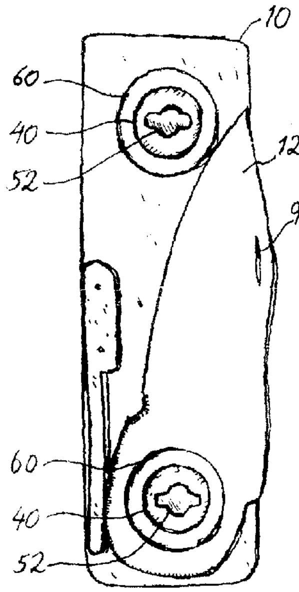
FIG. 1
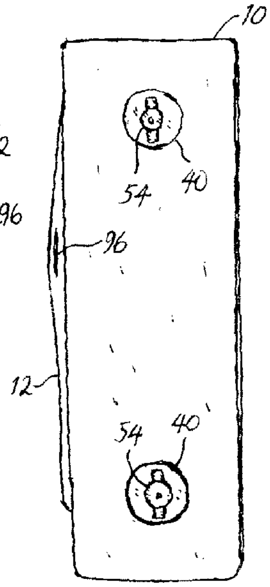
FIG. 2
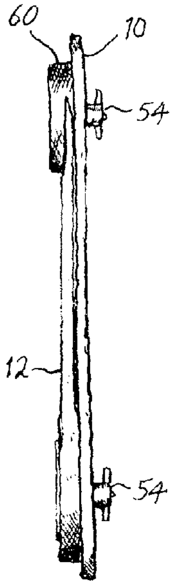
FIG. 3
FIG. 4
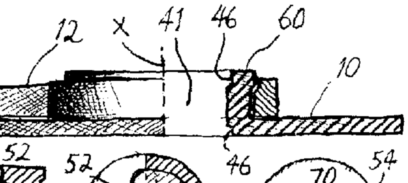
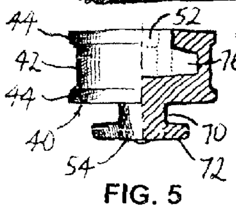
FIG. 5
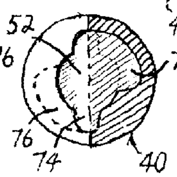
FIG. 6
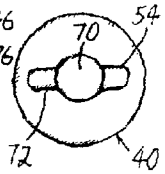
FIG. 7
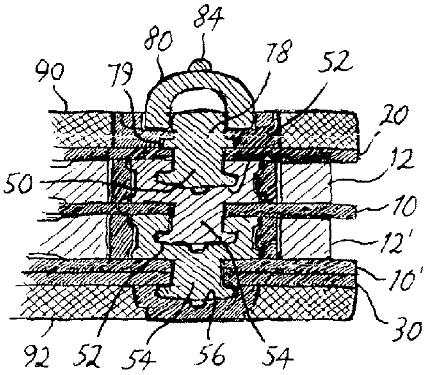
FIG. 8

MODULAR TOOL SYSTEM

CROSS-REFERENCES TO RELATED APPLICATIONS

This application claims the benefit of U.S. Provisional Application No. 61/062,776, filed Jan. 30, 2008, the entire contents of which are hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to a modular tool system for utility tools and pocket knives.

2. Description of the Related Art

Pocket tools, such as Swiss knives, are known in prior art. A pocket tool is used to carry a number of utility tools and/or knives together where each tool can be pulled out for individual use. However, the tools are usually fastened together by one or two fixed pivot pins and are therefore not replaceable or interchangeable.

There is a need to provide a modular tool system with releasable locking mechanism whereby utility tools can be detachably mounted on tool-carrying modules whereby tools and tool-carrying modules can easily be replaceable and interchangeable.

The above description of the background is provided to aid in understanding the modular tool system disclosed in the present application, but is not admitted to describe or constitute pertinent prior art.

BRIEF SUMMARY OF THE INVENTION

A modular tool system is provided. In one aspect, the modular tool system includes a tool-carrying plate, a top plate, a bottom plate and a pair of locking members. The tool-carrying plate includes upper and lower sides. The top plate is coupled to the upper side of the tool-carrying plate and includes a key. The base plate is coupled to the lower side of the tool-carrying plate and has a keyway. The locking members are disposed at two opposite ends of the tool-carrying plate. Each locking member is rotatably mounted in an opening of the tool-carrying plate. Each locking member includes a keyway facing the upper side of the tool-carrying plate and is sized and shaped for receiving and engaging with the key of the top plate. Each locking member further includes a key facing the lower side of the tool-carrying plate and is sized and shaped for inserting into and engaging with the keyway of the base plate. The key of the top plate is turnable relative to the keyway of the locking member, such that the top plate and the tool-carrying plate are lockable together. The key of the locking member is turnable relative to the keyway of the base plate, such that the tool-carrying plate and the base plate are lockable together.

In another aspect, the modular tool system includes a first plate having a key, a second plate having a keyway, a tool-carrying plate sandwiched between the first plate and the second plate, and a locking member. The locking member is rotatably mounted in an opening of the tool-carrying plate. The locking member includes a keyway adapted to receive and engage with the key of the first plate. The locking member further includes a key adapted to insert into and engage with the keyway of the second plate. The key of the first plate is turnable relative to the keyway of the locking member, such that the first plate and the tool-carrying plate are lockable together. The key of the locking member is turnable relative to the keyway of the second plate, such that the tool-carrying plate and the second plate are lockable together.

BRIEF DESCRIPTION OF THE SEVERAL VIEWS OF THE DRAWINGS

Specific embodiments of the modular tool system disclosed in the present application will now be described by way of example with reference to the accompanying drawings wherein:

FIG. 1 is a top plan view of a tool-carrying plate according to an embodiment disclosed in the present application.

FIG. 2 is a bottom plan view of the tool-carrying plate of FIG. 1.

FIG. 3 is a side view of the tool-carrying plate of FIG. 1.

FIG. 4 is an enlarged fragmentary side/sectional view of the tool-carrying plate of FIG. 1.

FIG. 5 is a side/sectional view of a locking member of the modular tool system according to an embodiment disclosed in the present application.

FIG. 6 is a top/sectional view of the locking member of FIG. 5.

FIG. 7 is a bottom view of the locking member of FIG. 5.

FIG. 8 is a fragmentary cross sectional view of the modular tool system according to an embodiment disclosed in the present application.

DETAILED DESCRIPTION OF THE INVENTION

Figure 9:
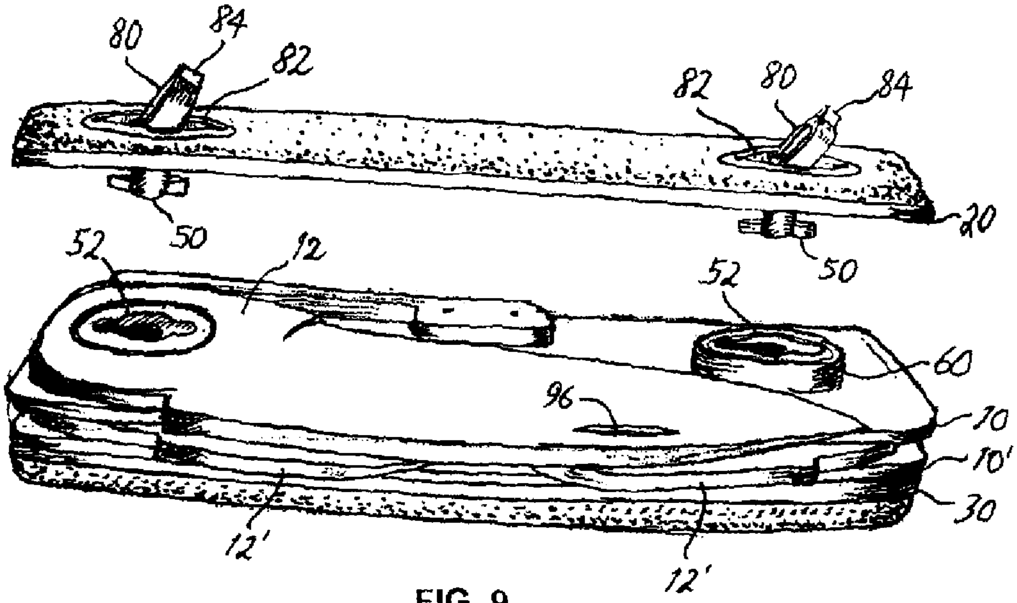
FIG. 9 is a partially exploded view of the modular tool system.

Reference will now be made in detail to a preferred embodiment of the modular tool system disclosed in the present application, examples of which are also provided in the following description. Exemplary embodiments of the modular tool system disclosed in the present application are described in detail, although it will be apparent to those skilled in the relevant art that some features that are not particularly important to an understanding of the modular tool system may not be shown for the sake of clarity.

Furthermore, it should be understood that the modular tool system disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the appended claims.

For illustration purposes, the terms “upper”, “lower”, “left”, “right”, “vertical”, “horizontal”, “top”, “bottom”, or “base” appeared hereinafter relate to the modular tool system as it is oriented in the drawings. It is understood that the modular tool system may assume various positions, except where expressly specified to the contrary. Furthermore, it is understood that the specific devices shown in the drawings, and described in the following description, are simply exemplary embodiments. Hence, specific dimensions and other physical characteristics related to the embodiments disclosed hereinafter are not to be considered as limiting.

It should be noted that throughout the specification and claims herein, when one element is to be "coupled" to another, this does not necessarily mean that one element is fastened, secured, or otherwise attached to another element. Instead, the term "coupled" means that one element is either connected directly or indirectly to another element or is in mechanical or electrical communication with another element.

The phrase "integrally formed" refers to a body that is manufactured integrally, i.e., as a single piece, without requiring the assembly of multiple pieces. Multiple parts may be integrally formed with each other if they are formed from a single workpiece.

The modular tool system of the present application may include a tool-carrying plate 10 for carry a tool 12, a top plate 20 coupled to one side of the tool-carrying plate 10, and a base plate 30 coupled to an opposite side of the tool-carrying plate 10. A pair of locking members 40 may be disposed at the two opposite ends of the tool-carrying plate 10.

As shown in FIGS. 1-3, the tool-carrying plate 10 is in the form an elongated plate and has two opposite ends. A tool 12, such as a knife blade or a utility tool, can be mounted on an upper surface of the tool-carrying plate 10.

As shown in FIGS. 4-7, each locking member 40 can be rotatably mounted in an opening 41 of the tool-carrying plate 10, and has an axis of rotation X perpendicular to the tool-carrying plate 10. Each of the locking members 40 may be rotatably mounted within a collar 60 integrally formed on the tool-carrying plate 10. The tool 12 can pivot about the collar 60.

Each locking member 40 has a cylindrical body 42. Two annular projections 44 are integrally formed at two opposite ends thereof for rotatably coupling with two annular recesses 46 formed on the tool-carrying plate 10 thereby preventing axial movement of the locking member 40 relative to the tool-carrying plate 10.

The keys 50, 54 of the top plate 20 and the tool-carrying plate 10 may take the form of a T-shaped structure having an axial shaft 70 and two collinear transverse pins 72 at a free end thereof.

The keyways 52, 56 of the tool-carrying plate 10 and the base plate 30 may have an exterior opening 74 allowing the keys 50, 54 to be inserted therethrough, and two interior slots 76 in communication with the exterior opening 74 allowing the two pins 72 to engage therein after the keys 50, 54 is inserted and turned from an unlocked position to a locked position.

The two interior slots 76 may have a plan view in the shape of two opposite quadrants of a circle, as depicted in FIG. 6, allowing the pins 72 to turn clockwise about 90 degrees.

The two pins 72 and/or the two interior slots 76 may have co-operating tapering surfaces to facilitate frictional engagement at the locked position.

As shown in FIG. 8, each locking member 40 of the upper tool-carrying plate 10 has a keyway 52 facing the upper side for receiving and engaging a key 50 of the top plate 20, and a key 54 facing the lower side for insertion into and engagement with a keyway 52 of a lower tool-carrying plate 10'. Each locking member 40 of the lower tool-carrying plate 10' has a keyway 52 facing the upper side for receiving and engaging a key 54 of the upper tool-carrying plate 10, and a key 54 facing the lower side for insertion into and engagement with a keyway 56 of the base plate 30.

Turning of the key 50 of the top plate 20 relative to the keyway 52 of the tool-carrying plate 10 locks the top plate 20 and the upper tool-carrying plate 10 together, and further turning of the key 50 of the top plate 20 turns the key 54 of the upper tool-carrying plate 10 relative to the keyway 52 of the lower tool-carrying plate 10' and locks the two tool-carrying plates 10, 10', and finally turning of the key 50 of the top plate 20 turns the key 54 of the lower tool-carrying plate 10' relative to the keyway 56 of the base plate 32 and locks the lower tool-carrying plate 10' and the base plate 30 together.

If there is only one tool-carrying plate 10 between the top and base plates 20, 30, then turning of the key 50 of the top plate 20 relative to the keyway 52 of the tool-carrying plate 10 locks the top plate 20 and the tool-carrying plate 10 together, and turning of the key 50 of the top plate 20 turns the key 54 of the tool-carrying plate 10 relative to the keyway 56 of the base plate 32 and locks the tool-carrying plate 10 and the base plate 30 together.

As shown in FIG. 8, the key 50 of the top plate 20 is formed on a stem 78 rotatably mounted in an opening of the upper plate 20. The stem 78 has the same axis of rotation as the locking member 40. An annular projection 79 can be integrally formed on the stem 78 to rotatably couple to an annular recess formed on the top plate 20 so that axial movement of the stem 78 relative to the top plate 20 can be restricted.

The modular tool system may have cover plates 90, 92 provided on an outer surface of the top and base plates 20, 30 respectively. The cover plates 90, 92 may be made of plastic or wood to provide a better grip, and a more appealing and colorful outer appearance. The tool-carrying plates 10, 10', the top plate 20, and the base plate may be made of metal by conventional method such as metal stamping.

It can be seen that the modular tool system described in the present application may include one or more tool-carrying plates 10, 10' for carrying one or more tools 12, including but is not limited to knife blade, cutter, screwdriver bit, file blade, scissors, pliers, can opener, and bottle opener. The tool-carrying plates 10, 10' and the tools 12 can be replaceable and interchangeable.

The tool 12 may be pivotally coupled to the tool-carrying plate 10 and movable between a folded position where the tool 12 can be stored between the top and base plates 20, 30 serving as a tool holder, and an unfolded position where the tool 14 is swung out from the top and base plates 20, 30 which then serve as a handle of the tool 12 when in use.

Although it has been shown that the keys 50, 54 are T-shaped, it is contemplated that the keys 50, 54 may be in any other suitable shape such as "L" shape. Also, it is possible that the keys 50, 54 may turn a degree of more or less than 90 degrees.

Although it has been shown that there are two sets of locking member/key/keyway, it is understood by one skilled in the art that there may be only one set of locking member/key/keyway at the two opposite ends of the modular tool which can be sufficient to hold the tool-carrying plates 10, the top plate 20, and the base plate 30 together.

Figure 10:
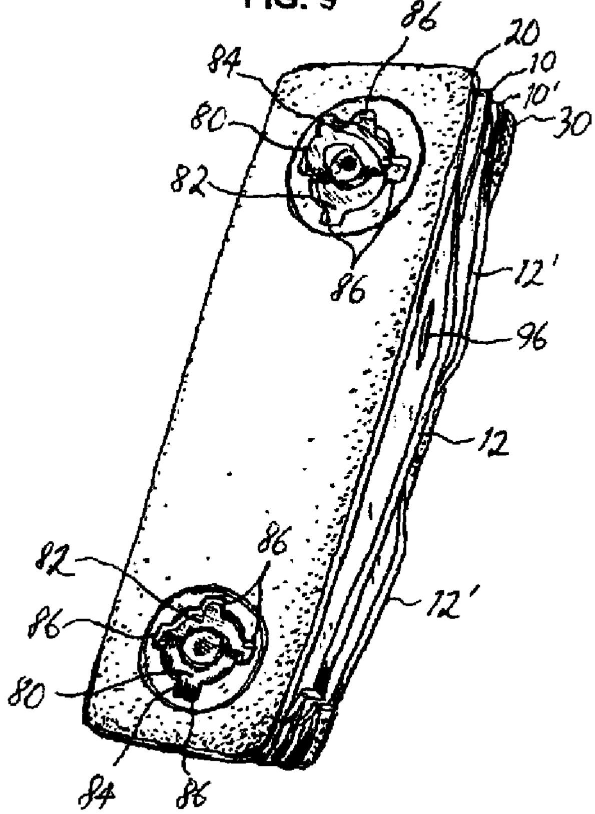
FIG. 10 is a perspective view the modular tool system.

As shown in FIGS. 9 and 10, the stem 78 may be provided with a finger grip 80 pivotably connected at an upper end of the stem 78. The finger grip 80 may pivot between an outwardly extending position to facilitate griping and turning of the key 50, and a flat position to lock the key 50 and prevent it from turning.

According to the illustrated embodiment, the finger grip 80 is generally C-shaped and adapted to lie flat in an annular recess 82. The C-shaped finger grip 80 may have a projection 84 for engagement with one of the four recesses 86 formed at 90 degrees around a circumference of the annular recess 82.

The modular tool system of the present application can be assembled in two main steps. The first step is to sandwich the selected tool-carrying plates 10, 10' with tools 12 between the top and base plates 20, 30. The second step is to lock the plates 10, 20, 30 together by turning the key 50.

Applying the modular tool system disclosed in the present application, a user can assemble a variety of multi-functional pocket tool according to his/her needs. For example, a user may want to assemble a modular tool having a knife and two cutters. The assembling of this can be illustrated with reference to FIGS. 8-10. A user first places the base plate 30 with the keyway 56 facing upwards. The tool-carrying plate 10' with two cutters 12' mounted thereon is coupled to the top of the base plate 30 by inserting the key 54 into the keyway 56 of the base plate 30. Then, another tool-carrying plate 10 with a knife blade 12 mounted thereon is coupled to the top of the tool-carrying plate 10 by inserting the key 54 into the keyway 52 of the tool-carrying plate 10' below. Finally, the top plate 20 is coupled to the top of the tool-carrying plate 10 by inserting the key 50 of the top plate 20 into the keyway 52 of the tool-carrying plate 10. This completes the first step of sandwiching the two tool-carrying plates 10, 10' between the top plate 20 and the base plate 30.

After the first step of placing one plate on top of the other, the user can then perform the second step of locking the top plate 20, the two tool-carrying plates 10, 10', and the base plate 30 together. This can be achieved by gripping the finger grips 80 by fingers and turning the key 50 clockwise 90 degrees in order to lock the top plate 20 and the second tool-carrying plate 10 together. The user continues to turn the key 50 a further 90 degrees clockwise to lock the first and second tool-carrying plates 10 together. Finally, the key 50 is turned another 90 degrees clockwise to lock the first tool-carrying plate 10 and the base plate 30 together. This completes the assembly of the modular tool having a knife 12 and two cutters 12' storing between the top and base plates 20, 30 in a folded position. One can unfold the knife blade 12 with the aid of an integral fingernail grip 96. One can simply reverse the steps to disassemble the modular tool.

While the modular tool system disclosed in the present application has been shown and described with particular references to a number of preferred embodiments thereof, it should be noted that various other changes or modifications may be made without departing from the scope of the appended claims.

What is claimed is:

1. A modular tool system comprising:

a first plate comprising a key;

a second plate comprising a keyway;

a tool-carrying plate sandwiched between the first plate and the second plate;

a locking member being rotatably mounted in an opening of the tool-carrying plate, the locking member comprising a keyway adapted to receive and engage with the key of the first plate, the locking member further comprising a key adapted to insert into and engage with the keyway of the second plate;

wherein the key of the first plate is turnable relative to the keyway of the locking member, such that the first plate and the tool-carrying plate are lockable together; and wherein the key of the locking member is turnable relative to the keyway of the second plate, such that the tool-carrying plate and the second plate are lockable together.

2. The system as claimed in claim 1, wherein the key is generally T-shaped having an axial rod and two collinear transverse pins at a free end thereof.

3. The system as claimed in claim 2, wherein the keyway comprises an exterior opening allowing the key to be inserted therethrough, and two interior slots in communication with the exterior opening allowing the two pins to engage therein after the key is inserted and turned from an unlocked position to a locked position.

4. The system as claimed in claim 3, wherein the two interior slots are generally in the shape of two diagonal quadrants of a circle allowing the two pins to rotate about 90 degrees.

5. The system as claimed in claim 3, wherein the two interior slots and/or the two pins comprise co-operating tapered surfaces to facilitate frictional engagement at the locked position.

6. The system as claimed in claim 1, wherein the locking member is rotatably mounted within a collar integrally formed on the tool-carrying plate.

7. The system as claimed in claim 1, wherein the locking member comprises a cylindrical body in which the keyway is formed, and two annular projections are integrally formed at two opposite ends thereof for rotatably abutting two annular recesses provided on the tool-carrying plate respectively for preventing axial movement of the locking member relative to the tool-carrying plate.

8. The system as claimed in claim 1, wherein the key of the first plate is formed on a stem rotatably mounted in an opening of the first plate, and has the same axis of rotation as the locking member.

9. The system as claimed in 8, wherein the key of the first plate comprises a finger grip pivotable at an upper end of the stem between an outwardly extending position to facilitate griping and turning, and a flat position to prevent turning of the key of the first plate.

10. A modular tool system comprising:

a tool-carrying plate comprising upper and lower sides;

a top plate coupled to the upper side of the tool-carrying plate, wherein the top plate comprises a key;

a base plate coupled to the lower side of the tool-carrying plate, the base plate comprises a keyway;

a pair of locking members disposed at two opposite ends of the tool-carrying plate, each locking member being rotatably mounted in an opening of the tool-carrying plate, each locking member comprising a keyway facing the upper side of the tool-carrying plate and sized and shaped for receiving and engaging with the key of the top plate, each locking member further comprising a key facing the lower side of the tool-carrying plate and sized and shaped for inserting into and engaging with the keyway of the base plate;

wherein the key of the top plate is turnable relative to the keyway of the locking member, such that the top plate and the tool-carrying plate are lockable together; and wherein the key of the locking member is turnable relative to the keyway of the base plate, such that the tool-carrying plate and the base plate are lockable together.

11. The system as claimed in claim 10, further comprising a plurality of tool-carrying plates mounting between the top and base plates, the plurality of tool-carrying plates being coupled one on top of the other by corresponding keys and keyways of the locking members, and an uppermost tool-carrying plate being coupled to the top plate and a lowermost tool-carrying plate being coupled to the base plate.

12. The system as claimed in claim 10, wherein the key is generally T-shaped having an axial rod and two collinear transverse pins at a free end thereof.

13. The system as claimed in claim 12, wherein the keyway comprises an elongated exterior opening allowing the key to be inserted therethrough, and two interior slots in communication with the exterior opening allowing two collinear transverse pins to engage therein after the key is inserted and turned from an unlocked position to a locked position.

14. The system as claimed in claim 13, wherein the two interior slots are generally in the shape of two diagonal quadrants of a circle allowing the two pins to rotate about 90 degrees.

15. The system as claimed in claim 13, wherein the two interior slots and/or the two pins comprise co-operating tapered surfaces to facilitate frictional engagement at the locked position.

16. The system as claimed in claim 10, wherein each of the locking members is rotatably mounted within a collar integrally formed on the tool-carrying plate.

17. The system as claimed in claim 10, wherein the locking member comprises a cylindrical body in which the keyway is formed, and wherein two annular projections are integrally formed at two opposite ends thereof for rotatably abutting two annular recesses provided on the tool-carrying plate respectively for preventing axial movement of the locking member relative to the tool-carrying plate.

18. The system as claimed in claim 10, wherein the key of the top plate is formed on a stem rotatably mounted in an opening of the top plate, and comprises the same axis of rotation as the locking member.

19. The system as claimed in 18, wherein the key of the top plate comprises a finger grip pivotable at an upper end of the stem between an outwardly extending position to facilitate griping and turning, and a flat position to prevent turning of the key of the top plate.

20. The system as claimed in claim 19, wherein the finger grip is generally C-shaped adapted to lie flat and sit in an annular recess, and wherein the finger grip comprises a projection for engagement with one of a plurality of recesses formed around a circumference the annular recess.

* * * * *